United States Patent [19]

Langenberg

[11] 4,414,782

[45] Nov. 15, 1983

[54] DIRECT DRIVE SYSTEM FOR A TURBINE SANDER

[75] Inventor: Anthony J. Langenberg, Brockville, Canada

[73] Assignee: Black & Decker Inc., Newark, Del.

[21] Appl. No.: 298,311

[22] Filed: Sep. 1, 1981

[51] Int. Cl.³ .............................................. B24B 23/00
[52] U.S. Cl. ................................. 51/170 MT; 51/174; 403/408
[58] Field of Search ......... 51/170 R, 170 MT, 170 T, 51/170 PT, 177, 174, 180; 403/360, 408; 15/354, 375, 387

[56] References Cited

U.S. PATENT DOCUMENTS 3,005,224 10/1961 Magarian ............................... 15/375
3,071,799 1/1963 Jepson et al. ............................ 15/387
3,345,784 10/1967 Stelljes et al. .................... 51/170 MT

*Primary Examiner*—Roscoe V. Parker
*Attorney, Agent, or Firm*—R. B. Sherer; Harold Weinstein; Charles E. Yocum

[57] ABSTRACT

A turbine-driven sander includes a direct drive system in which a one-piece thermoplastic shaft is rotatably journalled in a housing and mounts a two-piece turbine at one end and a counterweight and bushing at the other end. A machine screw is inserted through a longitudinal clearance bore in the shaft and clamps the turbine halves, shaft, counterweight and bushing together. The bushing is in turn pressed into a ball bearing, which is mounted in a platen. When the turbine rotates, the platen is oscillated, balanced by the counterweight.

8 Claims, 8 Drawing Figures

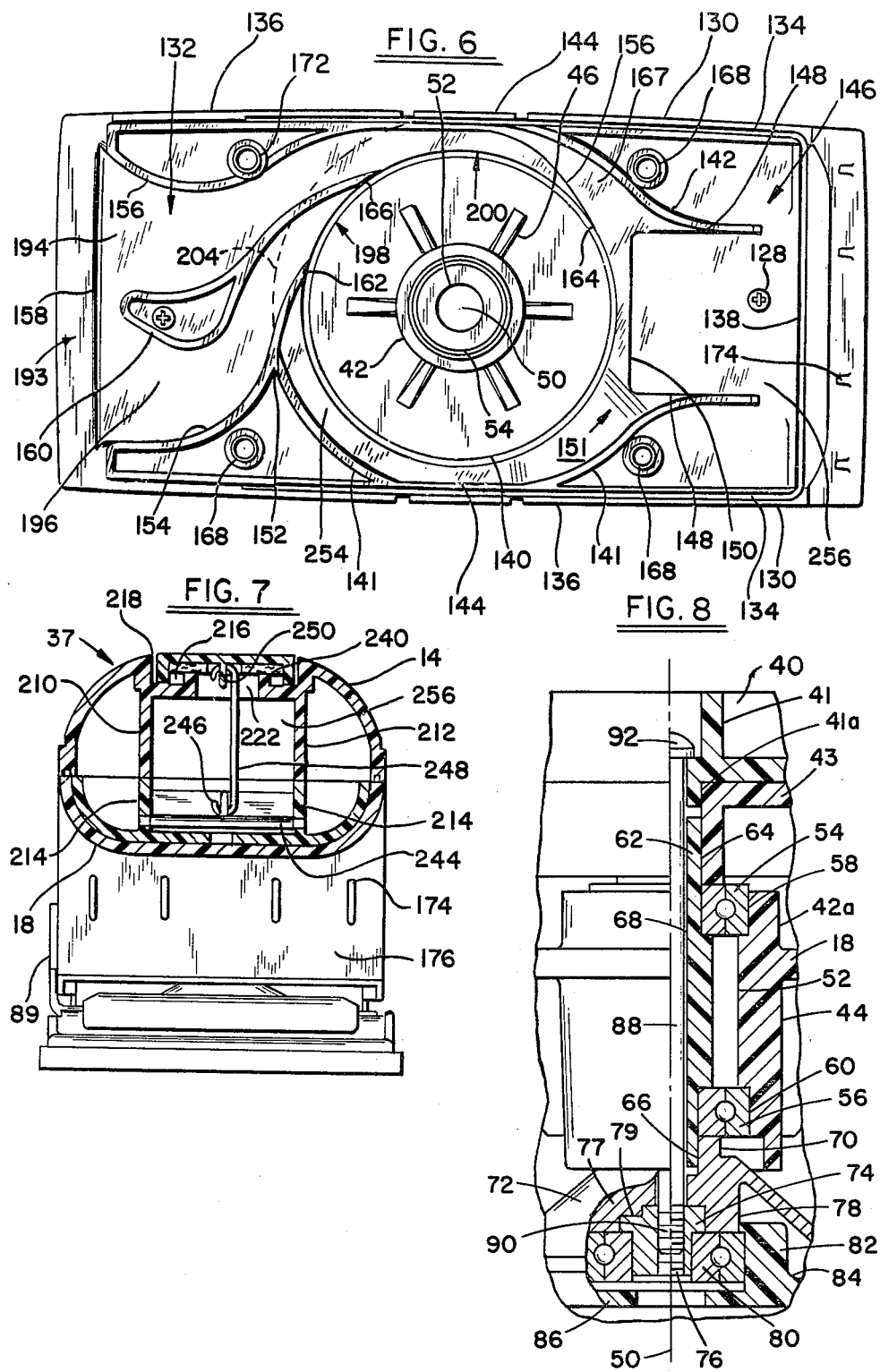

DIRECT DRIVE SYSTEM FOR A TURBINE SANDER

CROSS REFERENCE TO RELATED APPLICATIONS

The subject matter of this patent application is related to that disclosed in U.S. patent application Ser. No. 298,308, filed on Sept. 1, 1981, for a Turbine Sander, and assigned to the same assignee as the present application.

BACKGROUND OF THE INVENTION

1. Field of the Invention

This invention relates to air-powered tools, and more particularly to a hand-held turbine-driven orbital sander using a one-piece thermoplastic shaft and a machine screw inserted therein to mount a direct drive system, including two turbine halves, a counterweight, and a bushing drivingly connected to a platen.

2. Description of the Prior Art

Turbine driven tools have generally not used plastic drive shafts. U.S. Pat. No. 3,071,799 shows a turbine-powered cleaner in which a one-piece turbine is secured to one end of a shaft. A toothed pulley is secured to the other end of the shaft. Only the turbine is described as being plastic.

In conventional sanders using electric motors, a metal drive shaft is also typical, an exception being U.S. Pat. No. 3,345,784, which shows the use of an elastomeric flexible coupling between the motor shaft and a rotor. This coupling is merely a flexible intermediate element in the drive system.

SUMMARY OF THE INVENTION

A direct-drive system for a turbine-powered tool includes a one-piece thermoplastic shaft and an elongated machine screw mounted therein. The shaft is rotatably mounted in the tool housing and supports a two-piece turbine at one end and a counterweight at the other, thereby maximizing opportunities for mass-production and minimizing manufacturing costs.

It is an object of the present invention to provide a drive system or a turbine-driven tool which overcomes the prior art disadvantages; which is simple, economical and reliable; which uses a one-piece thermoplastic shaft rotatably journalled in the housing; which defines a longitudinal clearance bore; which contains a machine screw; which holds two halves of a turbine on one end of the shaft and a counterweight at the other; which counterweight contains an eccentrically-mounted bushing threadedly connected to the shaft; which bushing is mounted in a bearing mounted in a platen; which bushing, counterweight, shaft and turbine halves are held in compression by the machine screw so the rotation of the turbine oscillates and platen.

Other objects and advantages will be apparent from the following description of one embodiment of the invention; the novel features will be particularly pointed out hereinafter in the claims.

BRIEF DESCRIPTION OF THE DRAWINGS

The invention is illustrated in the accompanying drawings in which:

FIG. 6 is a detail plan view of a lower housing member, taken along line 6—6 of FIG. 4.

FIG. 7 is a rear elevational view, partly in section, taken along line 7—7 of FIG. 4.

FIG. 8 is an elevational cutaway detail view partially in section, of the direct drive system of the present invention.

DESCRIPTION OF THE PREFERRED EMBODIMENT

Figure 1:
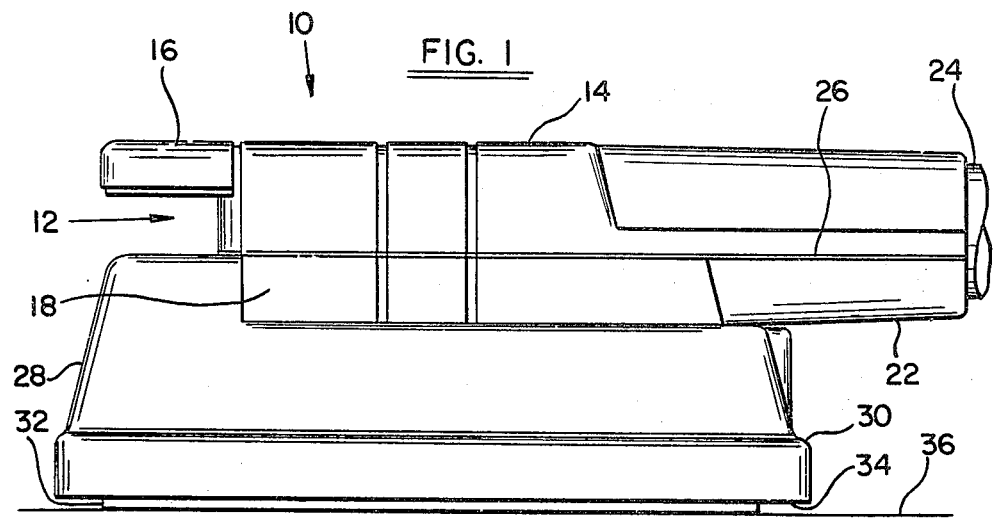
FIG. 1 is a side elevational view of a sanding tool embodying the present invention.
Figure 2:
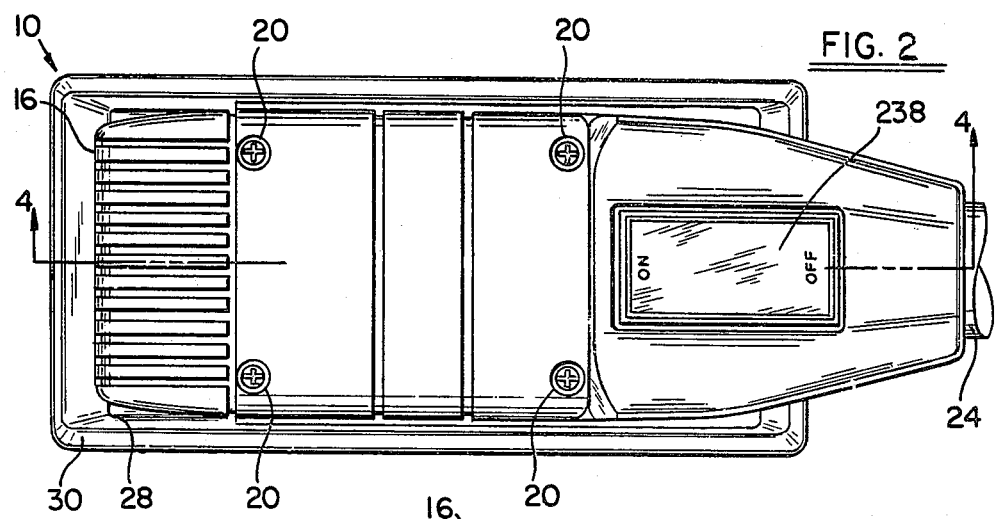
FIG. 2 is a plan view of the sanding tool embodying the present invention.
Figure 3:
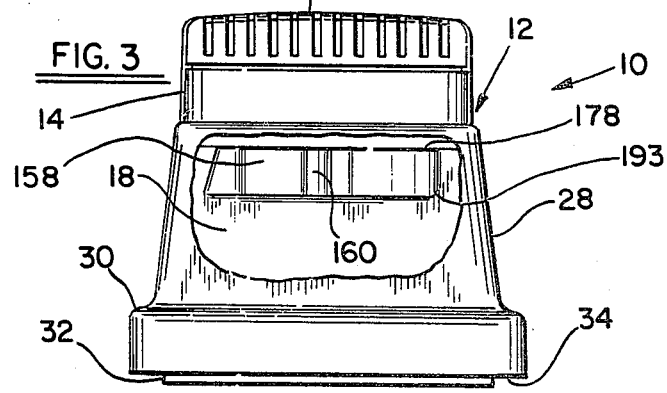
FIG. 3 is a front elevational partially cutaway view of the sanding tool of FIG. 1.

Referring to FIGS. 1, 2 and 3, a turbine-powered orbital sander referred to generally as 10 is shown embodying the present invention. A streamlined exterior sander housing assembly 12 includes three one-piece molded plastic members. The first member, an upper handle 14 having a ribbed front handgrip 16, is secured to the second member, a lower housing 18, by fasteners 20. The third member is a tapered vacuum line receptacle 22 mounted beneath the rear of the upper handle 14, and connected to a fitting 24 of an air hose leading to a vacuum source (not shown). The three housing members 14, 18 and 22, are joined along a common boundary 26. A one-piece dust shroud 28 is mounted on the lower housing 18. The dust shroud 28 has a flared portion 30 which is spaced outwardly from platen 32 so that a bottom edge 34 of the shroud 28 is suspended just above worksurface 36.

Figure 4:
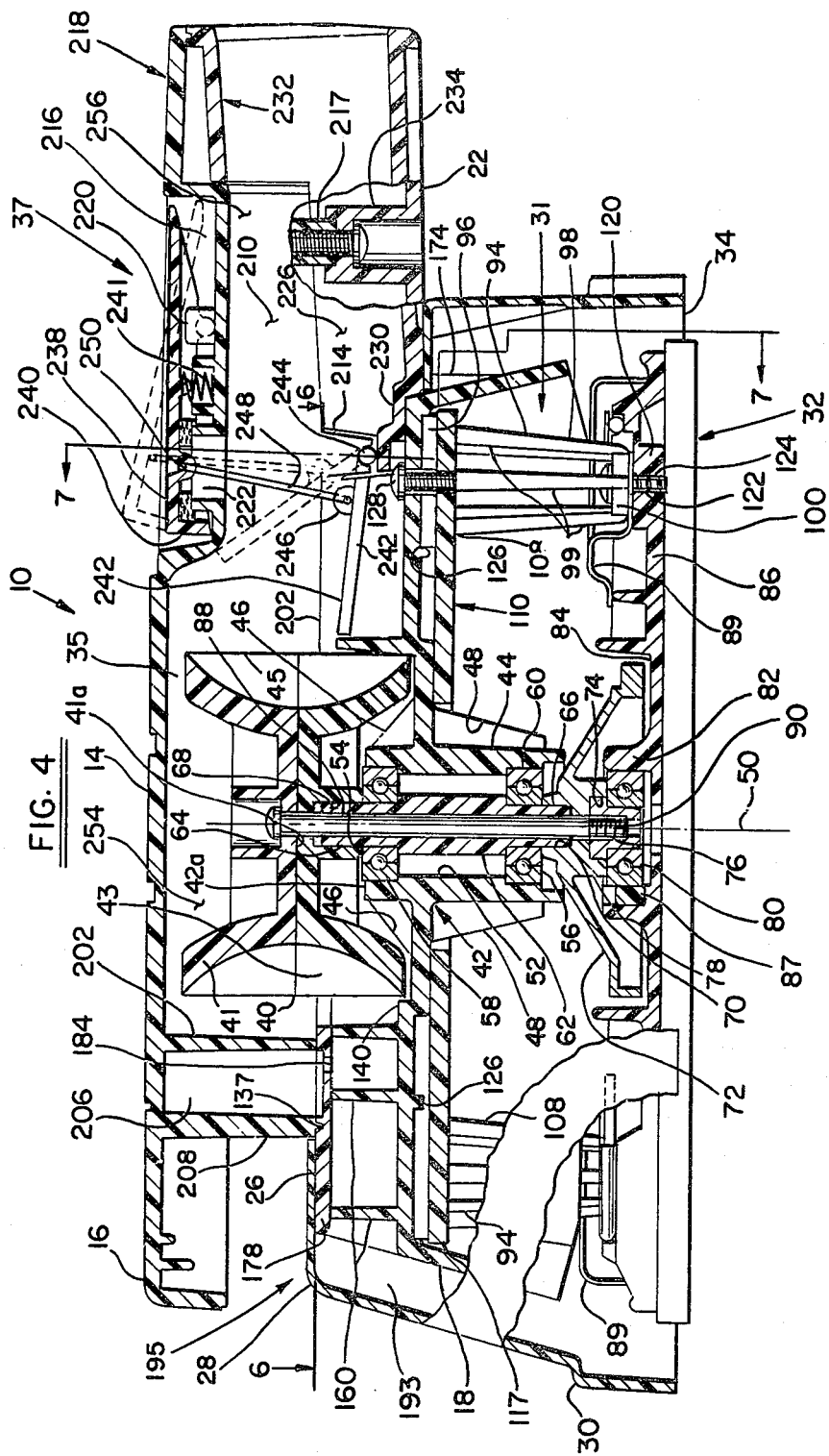
FIG. 4 is a side elevational sectional view, partially cutaway, taken along line 4—4 of FIG. 2.
Figure 5:
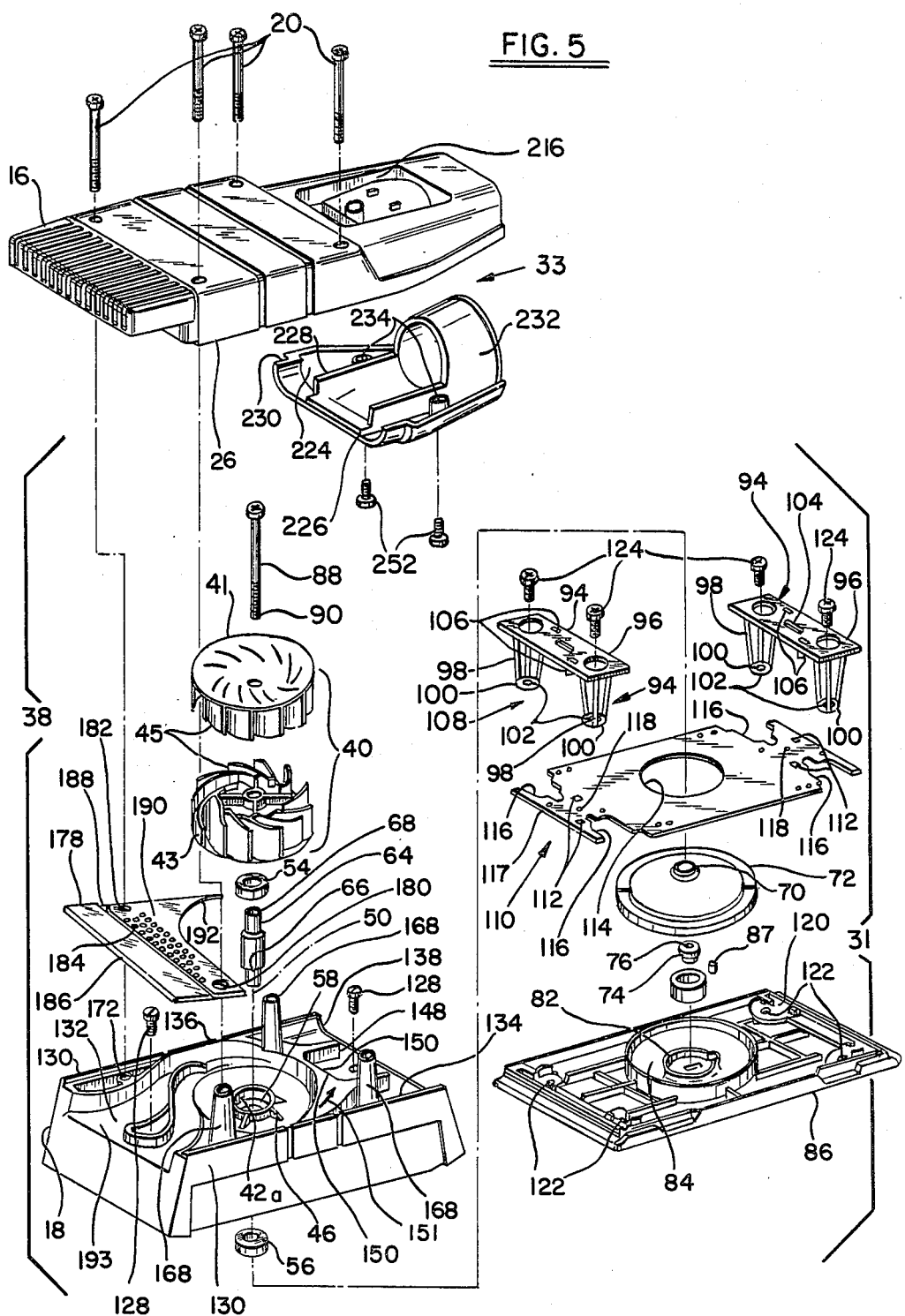
FIG. 5 is an exploded perspective view of the sanding tool, illustrating the direct drive system of the present invention.

As shown in FIGS. 4 and 5, housing assembly 12 encloses several systems which coact to produce the present sander 10. A flexible, four-point suspension system 31 supports the sander housing 12, which encloses an easily-assembled interfit system 33. The interfit system 33 defines a set of air chambers 35 which guide air flow to a switching system 37 with a minimum of turbine noise. The switching system 37 permits the operator to quickly engage and disengage a turbine direct drive system 38, without having to connect and disconnect the sander 10 and the fitting 24. When engaged, the drive system 38 interacts with the suspension system 31 to yield the sander's oscillating motion.

The first system to be described is the turbine direct-drive system 38. FIGS. 4, 5 and 8 illustrate a turbine 40 constructed of a turbine upper half 41 interlocked as at 41a with a turbine lower half 43. A plurality of turbine vanes 45 are configured such that air entering the turbine lower half 43 exits from the turbine upper half 41.

The turbine 40 is mounted in the housing assembly 12 using a minimum of components. A hub 42 is formed with an upper hub portion 42a and a lower hub portion 44, which are integrally molded on the lower housing 18. A plurality of upper ribs 46 and lower ribs 48 are also integrally molded on lower housing 18 and provide additional support for hub 42. The hub 42 is located concentrically about a turbine axis 50, and defines a bore 52, also located concentrically about the turbine axis 50. Upper and lower ball bearings 54, 56 are pressed into upper and lower counterbores 58, 60, respectively, in bore 52 such that their respective axes of rotation are coincident with turbine axis 50.

A one-piece thermoplastic shaft 62, composed of approximately 30% glass-filled nylon, has a reduced diameter upper portion 64 and a similar reduced diameter lower portion 66. The shaft 62 defines a longitudinal clearance bore 68. Upper and lower portions 64, 66 are mounted in bearings 54, 56, respectively, such that the longitudinal centerline of clearance bore 68 is coincident with turbine axis 50. The turbine 40 is mounted onto the upper portion 64 of shaft 62; a top 70 of counterweight 72 is mounted onto the lower portion 66. Therefore the one-piece shaft 62 and its support structure provides a rapid alignment of counterweight 72 with turbine 40, along the turbine axis 50.

A bushing 74, shown in FIGS. 4, 5 and 8 having a threaded bore 76 is eccentrically located in a counterweight hub 78. As shown in FIG. 8, the bushing 74 is aligned with the counterweight hub 78 by a counterweight key or protrusion 77 engaging a mating recess 79 in the bushing 74. This ensures that the counterweight 72 balances the oscillations of the platen 32. The bushing 74 is pressed into a counterweight bearing 80. Bearing 80 is mounted in a hub 82 formed on upper surface 84 of a baseplate 86, and is trapped therein by plug 87. Platen 32 is attached to the baseplate 86.

The drive system 38 is assembled by inserting an elongated fastener or machine screw 88, having a threaded end 90 and a headed end 92, through the turbine 40, clearance bore 68, and counterweight 72, and into threaded engagement with bore 76 of bushing 74. When the screw 88 is tightened, it adds rigidity to the drive system components by placing them in slight compression. It also clamps the two turbine halves 41, 43 together.

The resultant drive system 38 is now aligned about a single axis 50. As turbine 40 rotates, it rotates shaft 62 and bushing 74, which in turn drives counterweight 72 and baseplate 86, thereby providing a balanced, oscillatory sanding motion to platen 32. An abrasive strip or sandpaper is attached to baseplate 86 via clamps 89, which are of conventional designs.

In addition to being connected to the baseplate 86 through the drive system 38 as described above, the lower housing 18 is supported upon the baseplate through the four-point suspension system 31, which provides both support and flexibility so that the suspension system 31 coacts with the drive system 38 to distribute the orbital sanding action about the platen 32.

The suspension system 31 includes two platen support members 94 as best seen in FIG. 5. Each platen support member 94 is a molded plastic body in the shape of an inverted "U" in which a flat cross-member 96 supports at each end a flexible post 98. Post 98 includes a plurality of downwardly extending flexible fingers 99 terminating in a disc 100 having a mounting hole 102. A longitudinal mounting slot 104 is formed in the cross-member 96 midway between each flexible post 98. Two downwardly-extending locking tabs or snaps 106 are formed diagonally between the flexible posts 98 and the mounting slot 104. Again referring to FIG. 5, a suspension subassembly 108 is created when two platen support members 94 are temporarily connected to a mounting member, such as a metal mounting plate 110. The metal mounting plate 110 has four locking apertures 112 so spaced as to receive the snaps 106 of the platen support members 94. The metal mounting plate 110 also includes a central clearance orifice 114, four corner cutouts 116, which extend in pairs towards each other from opposite sides adjacent the end 117 thereof, and a threaded mounting hole 118 formed inwardly of the end 117. The subassembly 108 is completed when the two platen support members 94 are snapped into the apertures 112 of the metal plate 110. The subassembly 108 now can be easily moved to and aligned with the other components of the suspension system 31 and the drive system 38.

During final assembly of the suspension system 31, subassembly 108 is attached to the baseplate 86 and then to the upper housing 18. A raised boss 120, shown in FIGS. 4 and 5, having a threaded aperture 122 is formed at each corner of the upper surface 84 of baseplate 86. A fastener 124 is inserted through each disc mounting hole 102 and into threaded engagement with each aperture 122 of baseplate 86. The subassembly 108 is then positioned against the lower housing 18 such that the cross-member 96 of each platen support member 94 is located in a mating recess 126 formed beneath the lower housing 18, and clearance orifice 114 is placed around ribs 48. Then a pair of fasteners 128 are inserted through the lower housing 18, the mounting slot 104, and into threaded engagement with holes 118 of metal plate 110, the slot 104 enhancing ease of alignment. When fasteners 128 are tightened they secure the platen support members 94 to the lower housing 18 by firmly sandwiching the platen support members 94 between the metal plate 110 and the lower housing 18. The drive system 38 is now axially entrapped therebetween but is free to rotate about the axis 50. Nevertheless, when the baseplate 86 is vibrated responsive to the orbital motion of the drive system 38, the flexible posts 98 of the suspension system 31 flex to accomodate such motion, while maintaining the axial distance of the drive system 38.

Having described the drive system 38 and suspension system 31, it is now appropriate to describe how a minimum of housing components interfit to guide and control air flow and to abate turbine noise, thereby powering the drive system 38.

Referring to FIGS. 4, 5 and 6, the lower housing 18 has two longitudinal integrally-molded exterior walls 130 of uniform height extending from a lower housing floor 132 to the plane of the common boundary 26. A shallow groove 134 is formed in the upper edges 136 of the walls 130 to accomodate a complementary peripheral sealing tongue 137 on upper handle 14. A similar shallow groove 138 is also formed in the floor 132 transverse to and intersecting the groove 134.

As shown in FIG. 6, a circular lower turbine well 140 is formed concentrically about turbine axis 50.

Again referring to FIG. 6, two sections 141, 142 of a curved turbine chamber wall merge with the exterior walls 130 at its midpoints 144, and curve inwardly to the exhaust end 146 of the lower housing 18, where the join switch chamber side walls 148. Walls 148 extend transversely to and rearwardly from switch chamber wall 150. The floor 132 slopes upwardly between wall 141 and well 140, as indicated by arrow 151 of FIG. 6. Wall 141 extends forwardly until it reaches junction 152 with a first nozzle wall 154. Nozzle wall 154 and a second nozzle wall 156 form the sides of a turbine air inlet 158 (see FIG. 3). A nozzle air-dividing wall 160 is located generally intermediate the nozzle walls 154, 156. All three nozzle walls 154, 156, 160 describe "S"-shaped paths converging rearwardly of the turbine air inlet 158. Walls 154 and 156 intersect the lower turbine well 140 at junctions 162, 164, respectively. Wall 160 stops at a point 166 on the arc intermediate the intersections 154, 156. A horizontal platform 167 is formed between nozzle wall 156 and tubing chamber wall 142, and merges with upward slope 151 of floor 132.

For strength and ease of alignment and assembly, three upwardly-extending, generally conical posts 168 are molded in the floor 132, as shown best in FIG. 5, and make up three support members of the housing interfit system 33. A short boss 172 extends upwardly to approximately the height of nozzle wall 156, as shown in FIGS. 5 and 6.

To complete the structure of lower housing 18 a plurality of vertical ribs 174 are formed on a rear surface 176 of the lower housing 18, thereby supplying additional support for the dust shroud 28.

As shown in FIGS. 4 and 5, a sub-element of the interfit system 33 is a nozzle cover plate 178, in each side of which are formed large and small mounting holes 180, 182, respectively. A plurality of noise attenuation holes 184 are formed in the cover plate 178 generally intermediate the mounting holes 180, 182. Forwardly of the noise attenuation holes 184 is a generally rectangular front section 186, in which is also formed a continuation 188 of the groove 134. A generally arcuate section 190 of the cover plate 178, having a flashed edge 192, extends rearwardly of the noise attentuation holes 184, adjacent the small mounting hole 182.

As shown in FIGS. 5 and 6, when the nozzle cover plate 178 is assembled on the lower housing 18, the large mounting hole 180 is placed over one of the posts 168, the small mounting hole 182 is positioned over boss 172, and flashed edge 192 is placed over points 162, 164 and 166 along the arc of the turbine well 140. Then the cover plate 178 is lowered onto the lower housing 18. The resultant structure is an inlet nozzle 193 having two channels 194, 196 which direct air to two entrances 198, 200 respectively, along the lower turbine well 140. The flashed edge 192 provides an air seal at the entrances 198, 200. The inlet nozzle 193 is one element of a turbine noise attenuation subsystem, shown generally as 195 in FIG. 4.

Referring to FIGS. 4 and 6 another interfit member is upper handle 14, which includes a second element of the noise attenuation subsystem 195. Handle 14 defines a generally circular wall 202, which follows a continuous contour traced by turbine chamber walls 141, 142 and the curve 204 shown in FIG. 6 (in phantom). Now referring to FIG. 4, adjacent the handgrip 16, a rectangular side branch resonator 206 is located between the circular wall 202 and exterior wall 208. A downwardly-extending post (not shown), similar to the upwardly extending posts 168, is recessed in the upper handle 14 adjacent the side branch resonator 206, such that it complements boss 172 of lower housing 18. This post is the fourth support member for the interfit system 33.

As shown in FIG. 4, when the upper handle 14 is assembled to the lower housing 18, the side branch resonator 206 is positioned over the noise attenuation holes 184 of the inlet nozzle 193. The noise attenuation holes 184 and side branch resonator 206 coact to minimize turbine noise; this combination in turn coacts with the inlet noise-attenuating nozzle 193 to provide the turbine noise attenuation subsystem 195.

The interfit system 33 also provides structure for mounting the switching system 37. Referring to FIGS. 4 and 7, wall 202 extends rearwardly, becoming two parallel upper switch chamber walls 210, 212. Between each wall 202, 210 and wall 202, 212, is located a downwardly extending tab 214.

Now referring to FIGS. 4, 5 and 7, a toggle well 216 is formed in the upper surface 218 of the upper handle 14. Toggle pivot brackets 220 are formed in each side of the toggle well 216, and a bypass aperture 222 is located in well 216 forwardly of the toggle pivot brackets 220. Two downwardly-extending integrally threaded posts 217 are located between walls 210 and the outer wall of upper handle 14.

Referring to FIG. 5, the final element of the interfit system 33 is the tapered receptacle 22, which includes a clamshell base 224 upon which are formed walls 226, 228. A stepped portion 230 is located forwardly of walls 226, 228. An integral tapered hoop portion 232 extends upwardly and rearwardly of the walls 226, 228 and is sized to tightly accommodate air hose fitting 24 (FIGS. 1 and 2). Two hollow bosses 234 extend upwardly between the walls 226, 228 and the clamshell base 224.

Again as shown FIG. 4, the switching system 37 includes a toggle lever 238 pivotally mounted on brackets 220 such that its upper surface is flush with the upper surface of upper handle 14. The toggle lever 238 is marked "on" at its forward position, and "off" at its rearward position (FIG. 2). Referring to FIG. 7, a felt gasket 240 is mounted on the underside of the toggle lever 238 above the bypass aperture 222, serving as an air seal. A coil spring 241 between the upper handle 14 and the toggle lever 238 normally biases the switch 236 "off", as shown in phantom in FIG. 4. A flap valve 242 has a integral pivot rod 244 at is rearmost end, and is pivotally connected at 246 to a connecting rod 248, which itself is pivotally connected at 250 to the toggle lever 238.

To assemble the interfit system 33 the switching system 37 is mounted in the upper handle 14 such that the flap valve pivot rod 244 is located immediately below tabs 214. Tapered receptacle 22 is then positioned such that pivot rod 244 is trapped between tabs 214 and stepped portion 230, hollow bosses 234 are adjacent posts 217, and hoop portion 232 is nested within the rear of the upper handle 14. As shown in FIG. 5, fasteners 252 complete the connection between the upper handle 14 and tapered receptacle 22. The upper handle 14 is then positioned above lower housing 18 such that resonant chamber 206 is above the holes 184 in nozzle cover plate 178, the downwardly extending post (not shown) is placed immediately above small mounting hole 182, and stepped portion 230 of the tapered receptacle 22 covers rear groove 138. Fasteners 20 are then inserted through the upper handle 14 downwardly into the small mounting hole 182 and the three vertical posts 168, threadedly engaging mounting plate 110.

The complete interfit system 33 provides a quickly-assembled, sealed set of air chambers, as follows: The upper handle wall 202 mates with lower housing walls 141, 142 to form a turbine chamber 254. Walls 210, 212 of the upper handle 14 mate with walls 148 of the lower housing 18 and walls 214 of the receptacle 22; together with wall 150, the resultant structure forms a valve chamber 256.

In operation, when the sander is connected to a vacuum source, and toggle lever 238 is depressed "on", air travels inwardly through nozzle passages 194, 196 into the turbine chamber 254. As air drives turbine 40, the air moves upwardly and is exhausted through valve chamber 256, into the vacuum source. When lever 238 is turned "off", air enters through the bypass aperture 222, flap valve 242 is closed, and the turbine 40 stops.

It will be understood that various changes in the details, materials, arrangements of parts and operating conditions which have been herein described and illustrated in order to explain the nature of the invention may be made by those skilled in the art within the principles and the scope of the invention.

What is claimed is:

1. An air-driven pad sander having a housing connected to a vacuum source, comprising:
    (a) a one-piece thermoplastic shaft having two ends and being rotatably journalled in the housing;
    (b) the shaft having a longitudinal axis and defining a clearance bore coaxial with the longitudinal axis;
    (c) a turbine powered by air flowing to the vacuum source and mounted on one end of the shaft;
    (d) the turbine having a turbine axis of rotation coincident with the shaft longitudinal axis;
    (e) a counterweight operatively connected to the other end of the shaft;
    (f) the counterweight including a bushing portion located eccentrically to the longitudinal axis of the shaft;
    (g) a connecting member slidingly mounted in the shaft clearance bore and connecting the turbine to the bushing portion; and
    (h) a platen connected to the housing and operatively associated with the bushing portion.

2. The combination claimed in claim 1, wherein:
    (a) the turbine being an assembly including an upper half and a lower half;
    (b) the upper and lower turbine halves defining a turbine bore coaxial with the shaft longitudinal axis; and
    (c) the connecting member being mounted in the turbine bore and clamping the turbine halves to the shaft.

3. The combination claimed in claim 2, further comprising:
    (a) an upper bearing and a lower bearing mounted in the housing;
    (b) the shaft having an upper end journalled in the upper bearing and a lower end journalled in the lower bearing; and
    (c) the axes of rotation of the upper and lower bearings, respectively, being coincident with the shaft longitudinal axis.

4. The combination claimed in claim 3, wherein:
    (a) the housing including a mounting portion lying in a plane generally transverse to the longitudinal axis of the shaft;
    (b) the mounting portion having an upper surface and a lower surface;
    (c) an upper hub being formed on the upper surface and a lower hub being formed on the lower surface;
    (d) the upper bearing being a first ball bearing mounted in the upper hub;
    (e) the lower bearing being a second ball bearing mounted in the lower hub;
    (f) the connecting member having two ends; and
    (g) the bushing portion threadedly engaging one end of the connecting member adjacent the lower hub.

5. The combination claimed in claim 4, further comprising:
    (a) a third ball bearing being connected to the bushing portion; and
    (b) the platen being drivingly connected to the third ball bearing.

6. The combination claimed in claim 5, wherein:
    (a) the bushing portion being a bushing eccentrically mounted in a hub formed on the counterweight; and
    (b) keying means for aligning the bushing with the counterweight to balance the drive system.

7. The combination claimed in claim 6, wherein:
    (a) the counterweight defining a counterweight clearance bore concentric with the shaft longitudinal axis;
    (b) the keying means including a protrusion formed on the counterweight hub and engaging a mating recess formed in the bushing;
    (c) the connecting member slidingly mounted in the counterweight clearance bore and threadedly engaging the bushing; and
    (d) the shaft being comprised of 30% glass-filled nylon.

8. The combination claimed in claim 4, wherein the connecting member being a fastener having a headed end engaging the turbine upper half.

* * * * *